TIME DIVISION MULTIPLEX TRANSMISSION SYSTEMS

Inventor
JEAN V. MARTENS

By [signature]
Attorney

| | ts1 | ts2 | ts3 | ts4 | ts5 | ts6 | ts7 | ts8 | ts9 | ts10 | ts11 | ts12 | ts1 |
|---|---|---|---|---|---|---|---|---|---|---|---|---|---|
| Pd | 0 | 1 | 0 | 1 | 0 | 1 | 0 | 1 | 0 | 1 | 0 | 1 | 0 |
| Pe | 0 | 0 | 1 | 1 | 0 | 0 | 1 | 1 | 0 | 0 | 1 | 1 | 0 |
| Pf | 0 | 0 | 0 | 0 | 1 | 1 | 1 | 1 | 0 | 0 | 0 | 0 | 0 |
| Pg | 0 | 0 | 0 | 0 | 0 | 0 | 0 | 0 | 1 | 1 | 1 | 1 | 0 |

Inventor
JEAN V. MARTENS
By [signature]
Attorney

TIME DIVISION MULTIPLEX TRANSMISSION SYSTEMS

Filed April 15, 1966 8 Sheets-Sheet 3

Inventor
JEAN V. MARTENS
By [signature]
Attorney

TIME DIVISION MULTIPLEX TRANSMISSION SYSTEMS

Filed April 15, 1966

Inventor
JEAN V. MARTENS
By [signature]
Attorney

Inventor
JEAN V. MARTENS
By [signature]
Attorney

April 21, 1970 J. V. MARTENS 3,508,006
TIME DIVISION MULTIPLEX TRANSMISSION SYSTEMS
Filed April 15, 1966 8 Sheets-Sheet 6

Inventor
JEAN V. MARTENS
By [signature]
Attorney

Inventor
JEAN V. MARTENS
By [signature]
Attorney

Inventor
JEAN V. MARTENS
By [signature]
Attorney

United States Patent Office 3,508,006
Patented Apr. 21, 1970

3,508,006
TIME DIVISION MULTIPLEX TRANSMISSION SYSTEMS

Jean Victor Martens, Deurne, Belgium, assignor to International Standard Electric Corporation, New York, N.Y., a corporation of Delaware Filed Apr. 15, 1966, Ser. No. 542,969
Claims priority, application Netherlands, Apr. 26, 1965, 6505274
Int. Cl. H04j *3/00*
U.S. Cl. 179—15 13 Claims

ABSTRACT OF THE DISCLOSURE

A PCM-TDM system including therein timing circuitry for generation of the various control pulse patterns of the system. The timing circuitry is composed of RTL circuits controlled by a double phase clock to produce a plurality of basic pulse signals whose transitions are controlled by the double phase clock. These basic pulse signals, in turn, produce the various control pulse patterns whose transitions are controlled by the transitions of the basic pulse signals. The accuracy of the length of the control pulse patterns is increased, since capacitors are eliminated as timing elements. The timing circuitry enables the combination of two similar N-channel PCM systems into a single 2N-channel system by simply reversing the input connections of the timing circuit of one N-channel system to the common double phase clock with respect to the input connections of the timing circuit of the other N-channel system.

The present invention relates to an N-channel time division multiplex transmission system including switching means operating under the control of timing means which are constituted by a source of timing pulses and by timing circuit means, said timing circuit means being connected to said source and forming the various control pulse patterns for controlling the operation of said switching means.

Such a system is well known in the art, e.g., from the article "An Experimental Pulse Code Modulation System for Short-Haul Trunks" by C. G. Davis, published in the Bell System Technical Journal, January 1962.

An object of the present invention is to provide a time division multiplex transmission system of the above type, but which is designed in such a way that close control of the length timing reliability of any of the previously mentioned control pulse patterns is performed, so that these patterns are not subject to fortuitous delay shifts, or other parasitic effects.

The present N-channel time division multiplex transmission system is characterized by the fact that said source generates first and second phase clock pulses which are provided at a first and a second output of the source, respectively, e.g., the second phase clock pulses occurring midway in the interval between the first phase clock pulses, that said timing circuit means have two inputs correspondingly connected to the two outputs of said source and form a number of basic pulse patterns using the clock pulses of both phases of said source, and that each of said control pulse patterns is formed either by a logic combination of a number of basic pulse patterns, or eventually by a single basic pulse pattern.

It is to be noted that in general sources which generate first and second phase clock pulses, commonly named double phase clocks, are well known in themselves, e.g., British Patent No. 913,981.

Another object of the present invention is to provide a 2N-channel time division multiplex transmission system by combining in a very simple way two similar N-channel time division multiplex transmission systems of the previous type.

In accordance with another characteristic of the invention, a 2N-channel time division multiplex transmission system constituted by a first and a second similar N-channel systems of the type defined above is characterized by the fact that said source of clock pulses is common to both said N-channel systems, the first and the second output of said source being connected, on the one hand, to the first and the second input of the timing circuit means of said first N-channel system, respectively, and, on the other hand, to the second and to the first input of the timing circuit means of said second N-channel system, respectively, that the basic and control pulse patterns formed by said first and said second timing circuit means are correspondingly identical in shape, but different in phase by a time interval equal to the interval between a first phase clock pulse from the second output of said source and its successive second phase clock pulse, and that the outputs of said first and second N-channel systems are coupled in parallel so that the transitions in the output information of said second system occur between the transition in the output information of said first system.

Thus, two identical N-channel systems may now be readily interlaced, whereas without the control pulses using two phases of clock pulses in accordance with the invention, the interlacing of two systems would require very accurate synchronization between the two.

The above mentioned and other objects and features of the invention will become more apparent and the invention itself will be best understood by referring to the following description of embodiments taken in conjunction with the accompanying drawings, in which:

FIG. 1 is a schematic block diagram of the sending part of a 12-channel PCM transmission system;

FIG. 2 schematically shows a 24-channel PCM system made of two similar 12-channel PCM systems in accordance with the invention;

Figure 1:
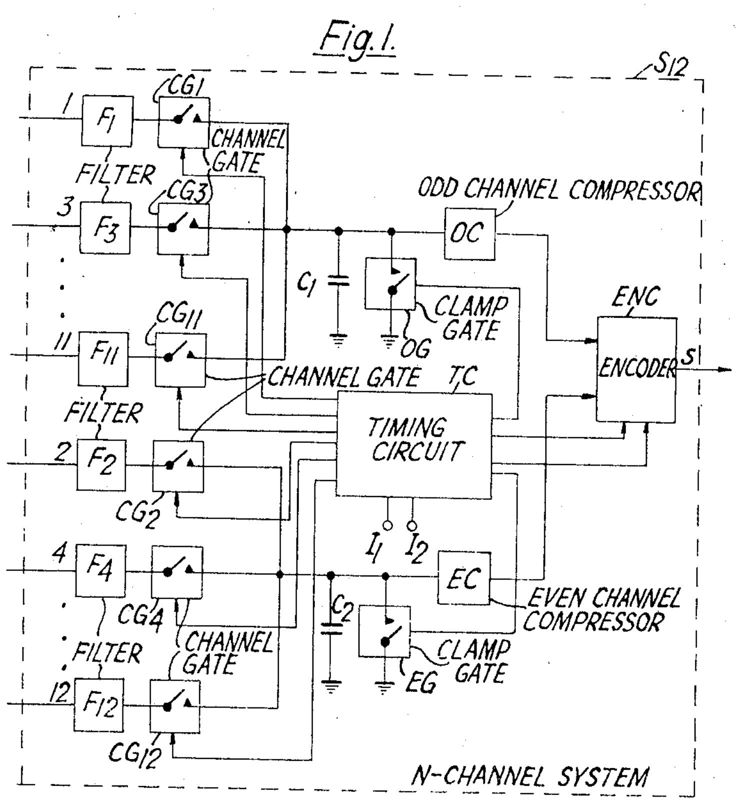
Figure 13:
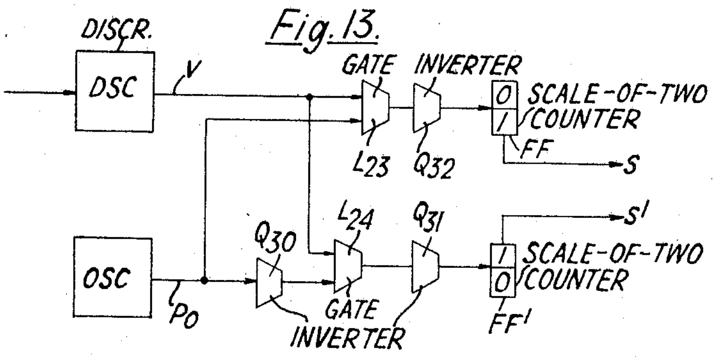
Figure 12:
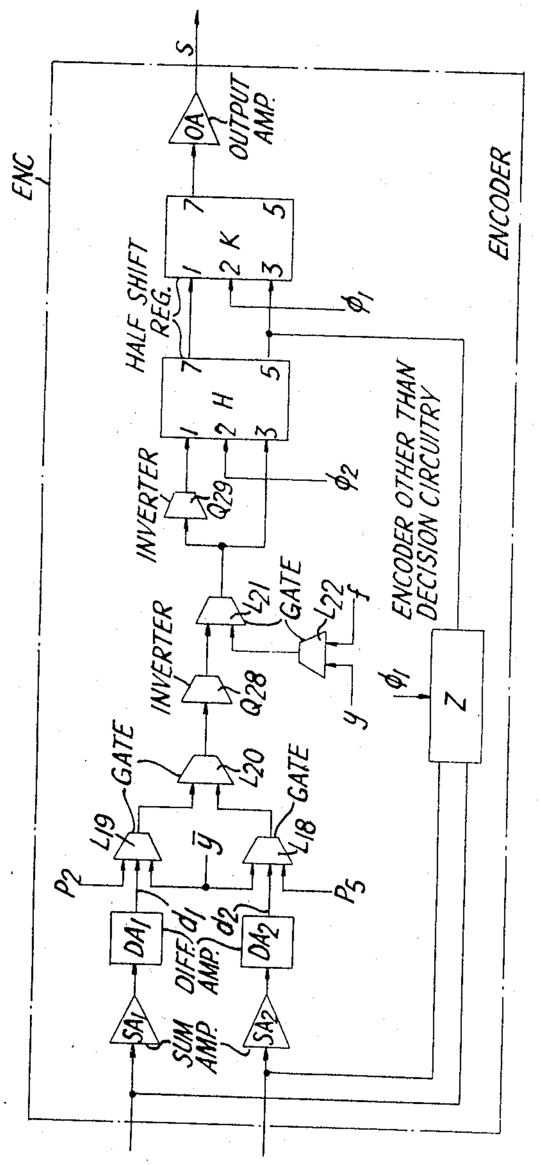

FIG. 12 schematically represents the encoder circuit ENC of the 12-channel system of FIG. 1;

FIG. 13 shows the input circuit at the receiving end of the line.

Referring to FIG. 1, there is shown the sending part of a 12-channel PCM transmission system S12 which is well known in the art. Each of the twelve input channels, numbered 1 to 12, comprises a filter F*i* in series connection with a corresponding channel gate CG*i* (*i*=1 to 12). The outputs of the odd numbered channel gates CG1, CG3, . . . , CG11 are connected in parallel and their junction point is connected, on the one hand, to an input of an encoder ENC through an odd compressor OC and, on the other hand, to one end of the parallel connection of a memory capacitor C1 and a clamp gate OG, the other ends of which are connected to ground. In a similar way the outputs of the even numbered channel gates CG2, CG4, . . . , CG12 are connected in parallel and their junction point is connected, on the one hand, to another input of the encoder ENC through an even compressor EC and, on the other hand, to one end of the parallel connection of a memory capacitor C2 and a clamp gate EG, the other ends of which are connected to ground. The output *s* of the encoder ENC is coupled to the transmission line (not shown). The operation of all the above gates as well of the encoder ENC is controlled by the timing circuit TC which has corresponding outputs connected thereto and provides at these outputs the suitable control pulse patterns.

This timing circuit TC has two inputs I1 and I2 which are connected to a double phase clock (not shown).

The control pulse patterns are the following: the channel gating patterns, the encoding patterns and the clamp patterns. The channel gating patterns control the various channel gates CG*i* each of which connects a channel input to a memory capacitor C1 or C2. The encoder ENC is connected to one or the other of these capacitors under the control of the encoding patterns. After each encoding cycle, the memory capacitors C1 or C2 are discharged via the clamp gates OG or EG controlled by the clamp patterns.

Figure 2:
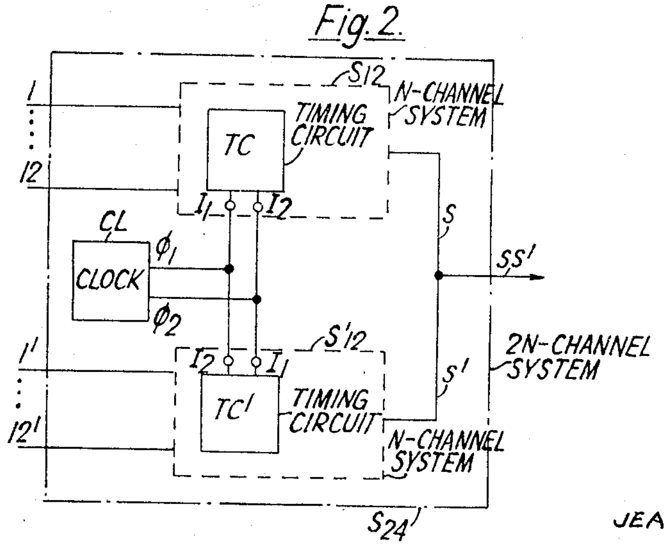

Referring to FIG. 2, the 24-channel PCL transmission system S24 shown therein, is constituted by two 12-channel system S12 and S'12 which are similar and of the type shown in FIG. 1. The inputs I1 and I2 of the timing circuit TC of the system S12 are connected to the outputs $\phi 1$ and $\phi 2$ of a common double phase clock CL, respectively, whereas the inputs I1 and I2 of the timing circuit TC' of the system S'12 are connected to the outputs $\phi 2$ and $\phi 1$ of this common clock, respectively. The respective outputs *s* and *s'* of the systems S12 and S'12 are connected in parallel and their parallel connection forms the output *ss'* of the 24-channel system S24. The double phase clock CL generates clock pulses of phase $\phi 1$ and $\phi 2$ appearing at the respective outputs $\phi 1$ and $\phi 2$ of this clock CL, the pulses of phase $\phi 2$ occuring midway in the interval between the pulses of phase $\phi 1$.

In order to simplify the description and make it easier to follow, hereinafter some specific assumptions will be made as to the mode of operation and timing organization of the two similar 12-channel systems S12 and S'12 which constitute the 24-channel system S24 of FIG. 2.

First, it is assumed that each channel slot of the 12-channel system S12 or S'12 comprises six digit slots, a digit slot being equal to the time interval between two consecutive clock pulses of the same phase $\phi 1$ or $\phi 2$, and that in each 12-channel system there are eleven speech channels and one synchronization channel, i.e., in each 12-channel system a channel slot, e.g., the twelfth, is used for transmitting framing or synchronization information, whereas the other eleven channel slots are only used for pulse-code-modulation of speech. Consequently, the twelfth speech channels of the systems S12 and S'12 shown in FIGS. 1, 2 have to be suppressed.

It is to be noted that any other timing organization is possible and the above assumption is made only for simplification purposes. It is further assumed that the pulse patterns of the timing circuits TC and TC' are ON-OFF pulse patterns, the ON and OFF conditions corresponding to 1 and 0 potential levels which are equal to the ground potential, and to a positive potential respectively.

Figures 3, 5:
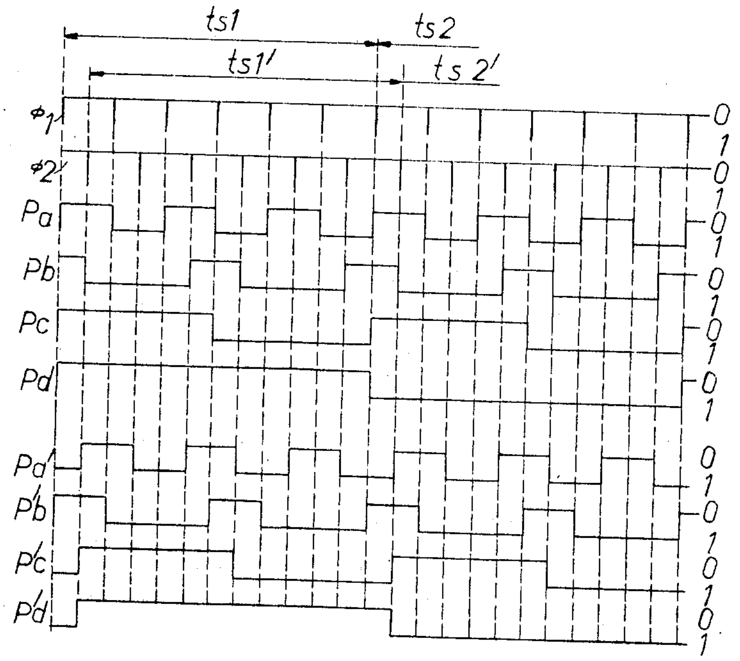
FIGS. 3 and 4 show various pulse patterns formed by the timing circuitry of the 12-channel systems of FIG. 2.
FIG. 5 is a table relating to the patterns of the system of FIG. 2.

FIG. 3 shows the clock pulse patterns $\phi 1$ and $\phi 2$, as well as some basic pulse patterns *pa* to *pd* and *p'a* to *p'd* formed in the timing circuits TC and TC', respectively. It is seen that the basic patterns *p'a* to *p'd* are correspondingly identical in shape to the patterns *pa* to *pd*, but that, with respect to the latter, they are shifted towards the right by a half digit slot. The channel slots *ts* and *ts'* of the systems S12 and S'12, as will be explained later, are equal to two consecutive transitions of the basic pulse patterns *pd* and *p'd*, respectively, so that two corresponding channel slots, e.g., *ts*1 and *ts'*1, are also shifted with respect to each other by a half digit slot.

The table of FIG. 5 gives the variations of *pd* and of the remaning basic pulse patterns *pe, pf, pg* of the timing circuit TC during the channel slots *ts*1 to *ts*12. It is seen that the pattern *pe* changes condition every two consecutive channel slots starting from the 0-condition during the slots *ts*1 and *ts*2; the pattern *pf* changes condition every four consecutive channel slots starting from the 0-condition during the slots *ts*1 to *ts*4, but it is held in the 0-condition after the end of the slot *ts*12 and the pattern *pg* assumes the 0-condition during the channel slots *ts*1 to *ts*8 and the 1-condition during the slots *ts*9 to *ts*12. The basic pulse patterns *p'e* to *p'g* of the timing circuit TC' are obtained from the table of FIG. 5 by replacing the patterns *pd* to *pg* and the channel slots *ts*1 to *ts*12, by their primes *p'd* to *p'g* and *ts'*1 to *ts'*12, respectively. It is to be noted that the transitions of the basic patterns *pb* and *p'b* occur together with clock pulses of phase $\phi 2$ and $\phi 1$, respectively, whereas the transitions of the remaining basic patterns *pa, pc* to *pg* and *pa', pc'* to *pg'* occur together with clock pulses of phase $\phi 1$ and $\phi 2$, respectively.

Figure 4:
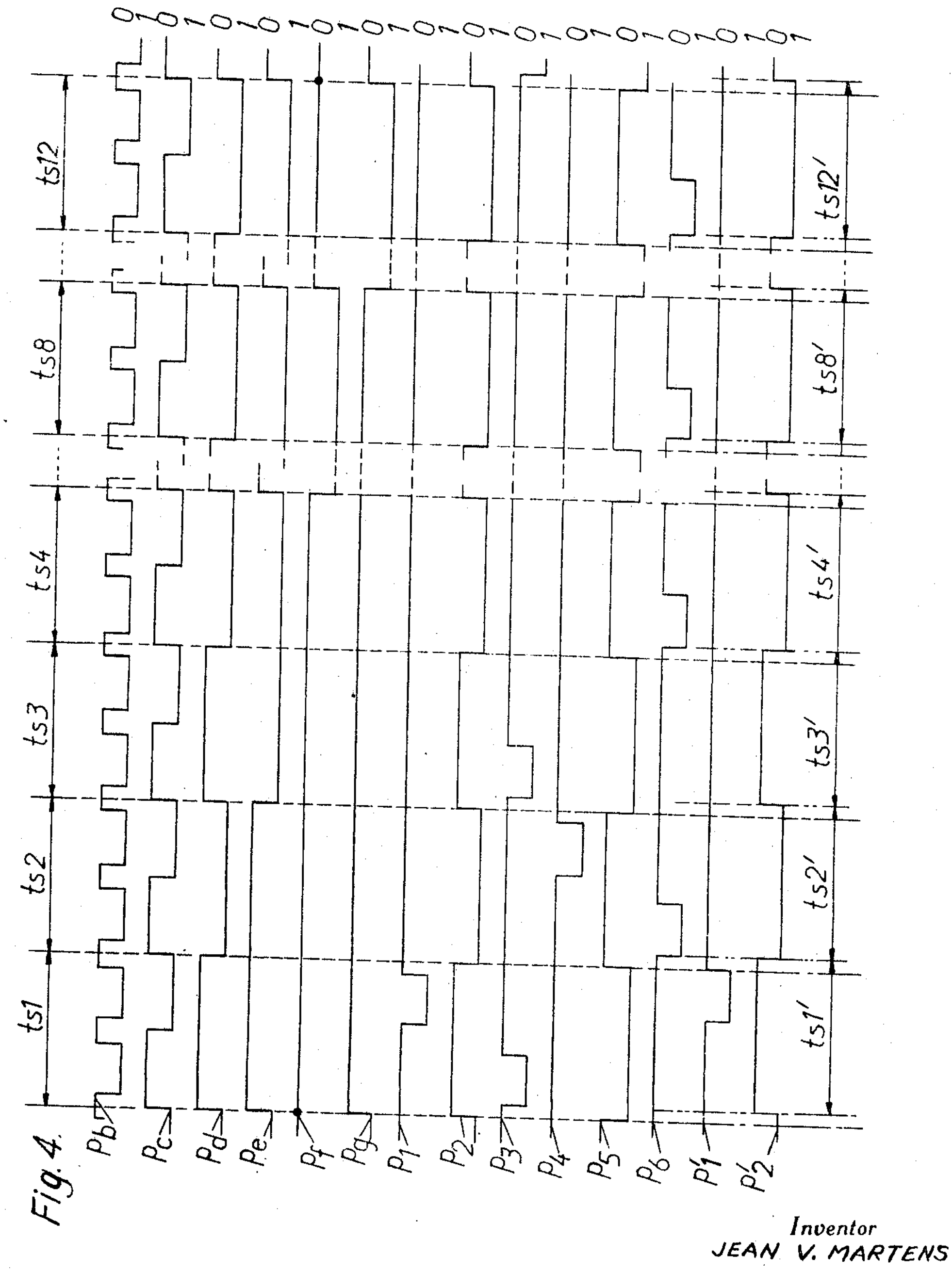

FIG. 4 represents on a reduced time scale with respect to that of FIG. 3, the basic pulse patterns *pb* to *pg*, as well as some control pulse patterns *p*1 to *p*6 of the timing circuit TC, during the twelve channel slots *ts*1 to *ts*12 and the control patterns *p'*1, *p'*2 of the timing circuit TC', during the channel slots *ts'*1 to *ts'*12.

The logic formulas and the duty functions of the controls pulse patterns *p*1 to *p*6 formed by the timing circuit TC of the system S12 are given here below:

$p_1=\overline{p}_d\cdot\overline{p}_e\cdot\overline{p}_f\cdot\overline{p}_g\cdot p_b\cdot p\cdot_c$ ----- Channel 1 gating pattern.
$p_2=p_d$ ---------- Encoding pattern for odd channels.
$p_3=\overline{p}_d\cdot p_b\cdot\overline{p}_c$ ---------- Clamping pattern for odd channels.
$p_4=p_d\cdot\overline{p}_e\cdot\overline{p}_f\cdot\overline{p}_g\cdot p_b\cdot p_c$ ------ Channel 2 gating pattern.
$p_5=\overline{p}_d$ ---------- Encoding pattern for even channels.
$p_6=p_d\cdot p_b\cdot\overline{p}_c$ ---------- Clamping pattern for even channels.

The control pulse patterns *p'*1 to *p'*6 of the timing circuit TC' of the system S'12 have formulas and duty functions similar to those of the previous patterns *p*1 to *p*6, so that they may readily be derived from the above, e.g., $p'_1=\overline{p}'_d\cdot\overline{p}'_e\cdot\overline{p}'_f\cdot\overline{p}'_g\cdot p'_b\cdot p'_c$ -- Channel 1' gating pattern.
$p'_2=p'_d$ ---------- Encoding pattern for odd channels.

It is obvious that in each of the two timing circuits TC and TC' there are formed as many channel gating patterns as there are speech channels in each 12-channel system S12 and S'12, respectively, i.e. eleven, channel gating patterns for each 12-channel system, or 22 channel gating patterns for the whole 24-channel system S24. The formulas of the other channel gating patterns of the 12-channel system S12 are given here-below:

Channel 3 gating pattern $=\overline{p}_d\cdot p_e\cdot\overline{p}_f\cdot\overline{p}_g\cdot p_b\cdot p_c$
Channel 4 gating pattern $=p_d\cdot p_e\cdot\overline{p}_f\cdot\overline{p}_g\cdot p_b\cdot p_c$
Channel 5 gating pattern $=\overline{p}_d\cdot\overline{p}_e\cdot p_f\cdot\overline{p}_g\cdot p_b\cdot p_c$
Channel 6 gating pattern $=p_d\cdot\overline{p}_e\cdot p_f\cdot\overline{p}_g\cdot p_b\cdot p_c$
Channel 7 gating pattern $=\overline{p}_d\cdot p_e\cdot p_f\cdot\overline{p}_g\cdot p_b\cdot p_c$
Channel 8 gating pattern $=p_d\cdot p_e\cdot p_f\cdot\overline{p}_g\cdot p_b\cdot p_c$
Channel 9 gating pattern $=\overline{p}_d\cdot\overline{p}_e\cdot\overline{p}_f\cdot p_g\cdot p_q\cdot p_c$
Channel 10 gating pattern $=p_d\cdot\overline{p}_e\cdot\overline{p}_f\cdot p_g\cdot p_b\cdot p_c$
Channel 11 gating pattern $=\overline{p}_d\cdot p_e\cdot\overline{p}_f\cdot p_g\cdot p_b\cdot p_c$ As already mentioned the twelfth channel slot is used for framing purposes. This channel slot is given by the pattern $y=p_d\cdot p_e\cdot\overline{p}_f\cdot p_g$.

The previous basic patterns are chosen so as to avoid coincidence of transitions in a gated pattern with transitions in the gating pattern, i.e., assuming that in each of the above channel gating and clamping patterns the gated pattern is the pattern *pb*, whereas the gating pattern is the indicated logic combination of the patterns $p_c, p_d, p_e, p_f, p_g$ and of their complements $\overline{p}_c, \overline{p}_d, \overline{p}_e, \overline{p}_f, \overline{p}_g$, it is clear that there is always a half-digit slot shift between these gated and gating patterns.

Figure 6:
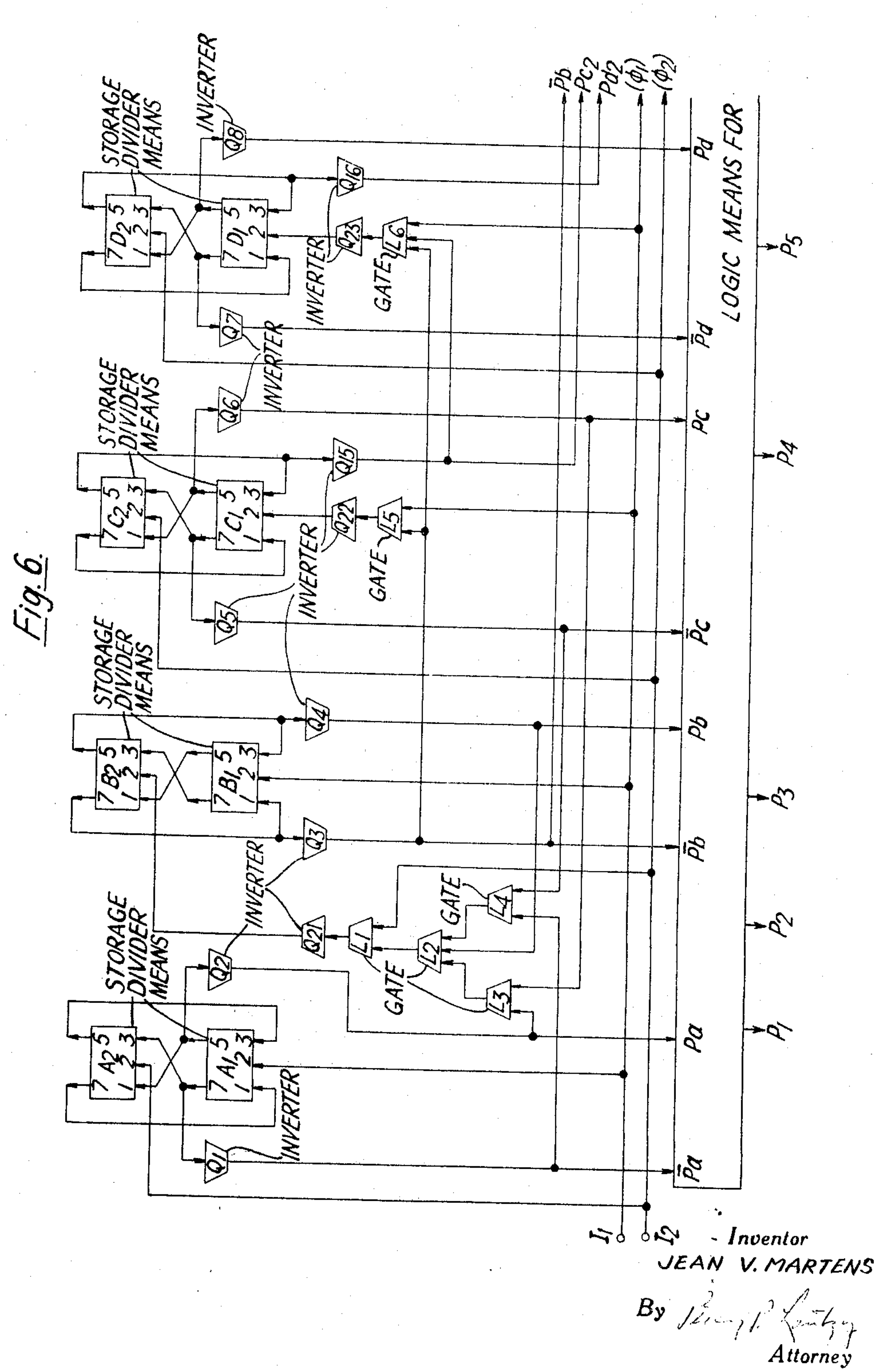
FIGS. 6 and 7 represent in block diagram, according to an embodiment of the invention, part of the timing circuitry of a 12-channel system, which makes part of the 24-channel system of FIG. 2.
Figure 7:
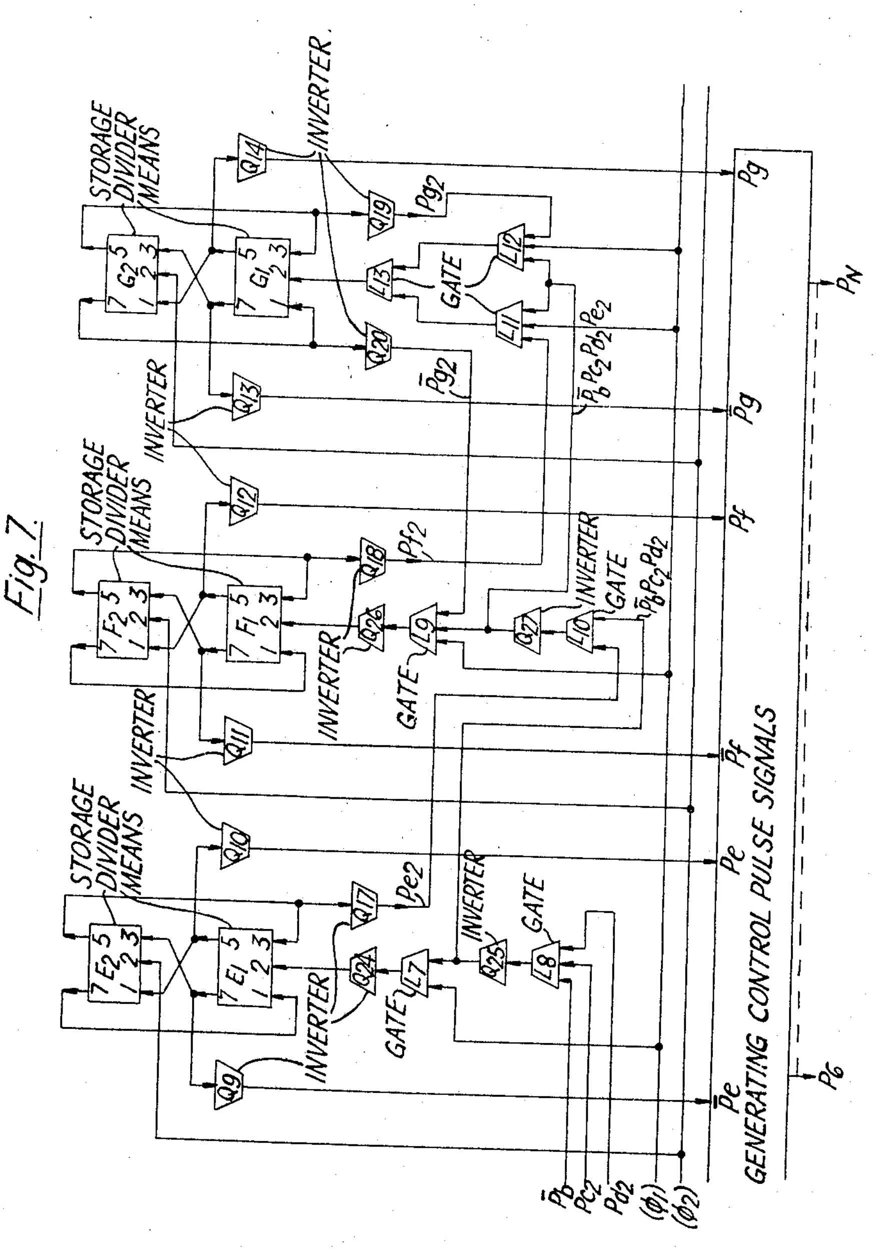
Figure 9:
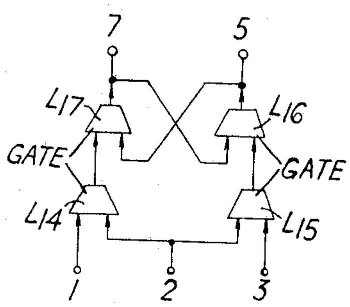
FIGS. 9 and 10 represent in detail some block circuits of FIGS. 6 and 7.
Figure 10:
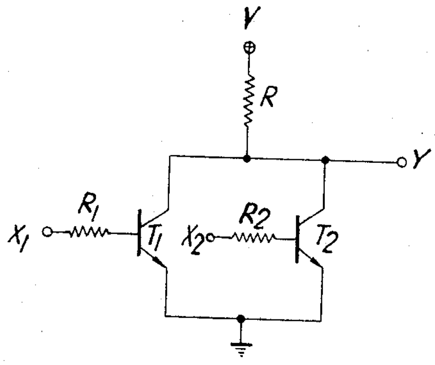
Figure 8:
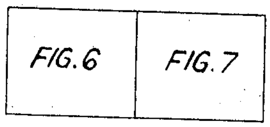
FIG. 8 shows the way the FIGS. 6 and 7 are to be combined.

FIGS. 6 and 7 show the part of the timing circuit TC of the 12-channel system S12 which generates the basic pulse patterns *pa* to *pg*. The inputs I1 and I2 of the timing circuit TC are connected to the inputs $\phi 1$ and $\phi 2$ of the clock CL, respectively (FIG. 2). The timing circuit TC (not shown) of the second 12-channel system S'12 is similar to TC, only the connection of its inputs I1 and I2 with the outputs $\phi 1$ and $\phi 2$ of the clock CL being reversed. It will therefore not be described. This part comprises seven dividers indicated by the references A1, A2 t› G1, G2 and a number of gates L1 to L13 and inverters Q1 to Q27. The above dividers are each constituted by a first and a second half shift register element A1 to G1, A2 to G2 which are identical. Each of the half shift register elements has three inputs indicated by 1, 2, 3 and two outputs indicated by 5, 7. The first and second elements of each divider A1A2 to G1G2 are interconnected as follows: the outputs 5 and 7 of each first element A1 to G1 are connected to the inputs 1 and 3 of the corresponding second element A2 to G2, whereas the outputs 5 and 7 of each second element A2 to G2 are connected to the inputs 3 and 1 of the corresponding first element A1 to G1. The above half shift register elements A1, A2, to G1, G2 are RTL (register transistor logic) gated input flip flops, e.g., Fairchild Micrologic Elements $\mu$L906, a half shift register element being constituted by four 2-input gates L14 to L17, as shown in FIG. 9. The gates L1 to L17, as well as the inverters Q1 to Q27 are also RTL circuits well known in the art and FIG. 10 represents the detailed circuitry of a 2-input gate, such as L1 or L14. With the negative logic convention which is adopted throughout the present description, i.e., the highest positive binary signal has the value "0," the above gates provide the logic function NAND (Not AND) and are commonly named NAND gates. This NAND function when applied to the 2-input gate of FIG. 10 is written: $Y=\overline{X}_1+\overline{X}_2$, where X1 and X2 are the respective two input binary signals and Y the output binary signal of the gate, i.e., the output signal Y has the value "1" if either of the input signals X1 or X2 has the value "0."

Taking into account the previous considerations the operation of the timing circuit of FIGS. 6 and 7 is now easy to understand.

The input 2 of the first and second half shift register elements A to G of each divider A1A2 to G1G2 are coupled to the inputs I1 and I2 of the circuit TC, respectively.

These inputs I1 and I2 being connected to the outputs $\phi 1$ and $\phi 2$ of the double phase clock CL, respectively. Due to this, the outputs 5, 7 of the first and second half shift registers of each divider A1 A2 to G1 G2 provide pulse patterns the transitions of which occur together with the $\phi 1$ and $\phi 2$ phase clock pulses, respectively. The basic pulse patterns *pa* and *pc* to *pg* the transitions of which occur together with the $\phi 1$ phase clock pulses are taken from the outputs 5 of the half shift registers A1 and C1 to G1 through the corresponding inverters Q2, Q6, Q10, Q12, Q14 whereas, their complements $\overline{pa}$ and $\overline{pc}$ to $\overline{pg}$ are taken from the outputs 7 of the same half shift registers throught the corresponding inverters Q1, 5, 7, 9, 11, 13 respectively. The basic pulse patterns *pb* and its complement $\overline{pb}$, of which the transitions occur together with the $\mu 2$ phase clock pulses, are taken from the outputs 5 and 7 of the half shift register element B2 through the inverters Q4 and Q3, respectively. The pulse patterns *pc*2, *pd*2, *pe*2, *pf*2, *pg*2 and $\overline{pg}2$, are auxiliary patterns used for generating the basic pulse patterns *pd* to *pg*. The auxiliary patterns *pc*2 to *pg*2 are taken from the outputs 5 of the half shift register elements C2 to G2 through the inverters Q15 to Q19, respectively, whereas the pattern $\overline{pg}$ is taken from the output 7 of the register element G2 through the inverter Q20. It is readily seen that the transitions of the above auxiliary patterns occur together with the $\phi 2$ phase clock pulses.

The inputs 2 of the second elements A2 and C2 to G2 and of the first elements A1, B1 are directly controlled by the clock pulses $\phi 2$ and $\phi 1$, respectively, whereas the inputs 2 of the first elements C1 to G1 and of the second element B2 are controlled by pulses given by the following logic functions which are formed by corresponding NAND gates and inverters mentioned hereinafter:

Input 2 of element B2: $\phi_2 \cdot [\overline{p}_b + p_b(p_a \cdot p_c + \overline{p}_a \cdot \overline{p}_c)]$, or its equivalent function $\phi_2[\overline{p}_b + p_a \cdot p_c + \overline{p}_a \cdot \overline{p}_c]$ formed by the gates L1 to L4 and the inverter Q21;

Input 2 of element C1: $\phi_1 \cdot \overline{p}_b$ formed by the gate L5 and the inverter Q22;

Input 2 of element D1: $\phi_1 \cdot \overline{p}_b \cdot p_{c2}$ formed by the gate L6 and the inverter Q23;

Input 2 of element E1: $\phi_1 \cdot \overline{p}_b \cdot p_{c2} \cdot p_{d2}$ formed by the gates L8, L7 and the inverters Q25, Q24.

Input 2 of element F1: $\phi_1 \cdot \overline{p}_b \cdot p_{c2} \cdot p_{d2} \cdot p_{e2} \cdot \overline{p}_{g2}$ formed by the gates L8, L10, L9 and the inverters Q25, Q27, Q26;

Input 2 of element G1: $\phi_1 \cdot \overline{p}_b \cdot p_{c2} \cdot p_{d2} \cdot p_{e2}(p_{f2}+p_{g2})$ formed by the gates L10, L11, L12, L13 and the inverter Q27.

From the above it is seen that the basic pulse patterns *pa* to *pg* are formed by using the $\phi 1$ and $\phi 2$ phase clock pulses in combination with basic patterns, so that capacitors are not required as timing elements in the timing circuits TC and TC', this resulting in a close control of the length timing reliability of any of these basic patterns. Furthermore the way of generation of the control patterns, i.e. either by taking a basic pulse pattern, as in the case of the encoding patterns *p*2, *p*5, or by AND-gating the basic pulse pattern *pb*(*p'b*), the transitions of which occur together with $\phi 2(\phi 1)$ phase clock pulses, with other basic pulse patterns *pa*, *pc* to *pg* (*p'a*, *p'c* to *p'g*), the transitions of which occur together with clock pulses of the other phase $\phi 1(\phi 2)$, leads to a further increase of the timing reliability of the entire system.

Figure 11:
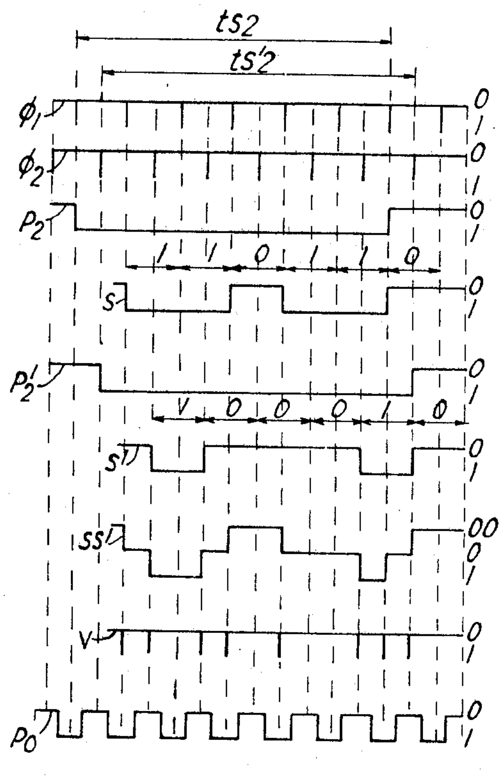
FIG. 11 shows an output information of the 24-channel system of FIG. 2, as well as pulse patterns formed at the receiving end of the transmission path.

FIG. 11 represents some pulse patterns appearing at the sending and receiving ends of the transmission path at a particular time interval. The patterns of the sending end are the following: the encoding patterns *p*2=*pd* and *p'*2=*p'd* during the channel slots *ts*2 and *ts'*2, the digital output information *s*(110110) and *s'*(100010) of the encoders ENC and ENC' of the 12-channel systems S12 and S'12 (FIG. 2), this information being the digital translation of the PAM signals stored in the memory capacitors C2 and C'2 during the channel slots *ts*1 and *ts'*1 (FIGS. 1, 4), respectively, and finally the combined output information *ss'* of the 24-channel system S24, this combined information being the sum of *s* and *s'*. The patterns of the receiving end are the following: the discriminator D.S.C. output pattern *v* and the oscillator pattern $p_o$. These latter patterns *v*, $p_o$, as well as the corresponding receiving circuit part shown on FIG. 13 will be explained later. FIG. 11 shows that between the encoding patterns *p*2 and *p'*2 and the information patterns *s* and *s'* there is a shift of one digit slot and that the transitions of *s* and *s'* take place together with the $\phi 1$ and $\phi 2$ phase clock pulses, respectively.

FIG. 12 diagrammatically shows the encoder ENC of the 12-channel system S12 of FIGS. 1 and 2. This encoder ENC is a digit-at-a-time, or sequential comparison dual encoder for which the circuitry is well known in the art, e.g. from the article "A Companded Coder For An Experimental PCM Terminal" by H. Mann et al., published in the Bell System Technical Journal, January 1962. Only the decision part of the present encoder ENC is different from the known one and, therefore, only this decision part is shown in some detail and will briefly be described hereinafter. The remaining parts of the encoder are similar to those shown in FIG. 21 of the above article and are represented by the block Z.

The decision part includes the summing amplifiers SA1 and SA2 which are connected in series with the differential amplifiers DA1 and DA2, respectively, the decision logic circuit comprising the NAND gates L18 to L22, the inverters Q28 and Q29, the half-shift register elements H, K and the output amplifier OA. The inputs of the summing amplifiers SA1 and SA2 are connected to the outputs of the odd and even compressors OC and EC, respectively (FIG. 1). The switching of the encoder ENC between the odd and even channel memory capacitors C1 and C2, as well as the inhibition of the differential amplifier outputs during the synchronization channel slot *ts*12, given by the pulse pattern $y=p_d \cdot p_e \cdot \overline{p}_f \cdot p_g$ is, performed by means of the gates L19, L18, respectively. Indeed, the differential amplifier outputs *d*1, *d*2 which at rest assume the zero condition, i.e., they are at a positive potential, are each connected to a corresponding input of the 3-input NAND gates L19 and L18, the other two inputs of these gates L19 and L18 being controlled by the pulse patterns *p*2, $\overline{y}$ and *p*5, $\overline{y}$, respectively. The outputs of the NAND gates L18 and L19 are connected to two corresponding inputs of the 2-input NAND gate L20 the output of which is connected to an input of the 2-input NAND gate L21 through the inverter Q28. The second input of the NAND gate L21 is connected to the output of the 2-input NAND gate L22 the two inputs of which are controlled by the above said pulse pattern *y* and by a framing or synchronization signal *f*, e.g., 101010, occurring in channel slots *ts*12 respectively. In this way, the output signal from the gate L21 is given by the function $\overline{y} \cdot [p_2 \cdot d_1 + p_5 d_2] + yf$. The output of the NAND gate L21 is connected, on the one hand, to the input 1 of the half shift register element H through the inverter Q29 and, on the other hand to the input 3 of this element H. The outputs 7 and 5 of the element H are connected to the inputs 1 and 3 of the second half shift register element K. The inputs 2 of the elements H and K are controlled by $\phi 2$ and $\phi 1$ clock pulses, respectively. The input of the amplifier OA is connected to the output 7 of the element K and its output *s* constitutes the output of the encoder ENC. The switching logic circuits of the encoder ENC which are included in the block Z, as well as the reset (not shown) of the differential amplifiers DA1 and DA2 are controlled by $\phi 1$ clock pulses. Hence, the decision instants of the encoder ENC occur at the phase $\phi 2$, since the half-shift register element H is triggered by $\phi 2$ clock pulses, and the switching instants occur on phase $\phi 1$, so that there is always a half-digit slot of rest. The half shift register element K only serves for shifting the output information from the element H over an additional half-digit slot so that the output information *s* of the encoder ENC has its transitions occurring together with the $\phi 1$ clock pulses. It is obvious that in the encoder ENC' of the second 12-channel system S'12 (FIG. 2) the roles of the phases $\phi 1$ and $\phi 2$ are reversed, i.e. the switching instants occur at the phase $\phi 2$ and the decision instants at the phase $\phi 1$ such that when combining the two 12-channel PCM systems S12 and S'12 in one 24-channel system S24 the transitions in the output information *s* and *s'* occur together with the $\phi 1$ and $\phi 2$ clock pulses, respectively.

Finally referring to FIG. 13, the input circuit of the receiving end comprises a discriminator circuit DSC the input of which is coupled to the line, and oscillator OSC, the NAND gates L23, L24, the inverters Q30 to Q32 and the scale-of-two counters FF and FF' such as those described in the article "Pulse Counting and Scaling by Sheffer Stroke Logic" by K. G. Nichols, published in the Electronic Engineering, May 1963. The discriminator DSC the output of which is normally at 0-level, i.e., positive, receives the three-level signal *ss'* from the line and provides at its output *v* a narrow 1-level pulse for each transition of the signal *ss'*. The oscillator OSC generates the regular pulse pattern *po* of which the alternately occurring marks and spaces have a half-digit slot width and are so phased with respect to the $\phi 1$ and $\phi 2$ clock pulses of the sending end that these $\phi 1$ and $\phi 2$ clock pulses occur midway in the width of a mark and a space of the pattern $p_o$ respectively. It is readily seen that the scale-of-two counters FF and FF' which are triggered by the pulses *pov* and $\overline{p}_o v$ provide at their 1-outputs the information *s* and *s'* of the systems S12 and S'12, respectively.

While the principles of the invention have been described above in connection with specific apparatus, it is to be clearly understood that this description is made only by way of example and not as a limitation on the scope of the invention.

I claim:

1. A time division multiplex transmission system comprising:

first switching means to control the generation of a first time division multiplex signal;

a clock pulse source having two outputs, one of said two outputs providing a first train of clock pulses and the other of said two outputs providing a second train of clock pulses related to said first train to have the clock pulses of said second train timed to be disposed intermediate the clock pulses of said first train; and first timing means coupled to said first switching means to time the operation thereof by a first plurality of control pulse signals including first means having a first input coupled to said one of said two outputs of said clock pulse source and a second input coupled to said other of said two outputs of said clock pulse source to produce a first plurality of basic pulse signals having predetermined patterns whose transitions are timed by clock pulses of said source, and second means coupled to said first means responsive to predetermined ones of said first plurality of said basic pulse signals to produce said first plurality of control pulse signals each having a predetermined pattern whose transitions are timed by transitions of a basic pulse signal of said first plurality of said basic pulse signals.

2. A system according to claim 1, wherein said second means includes means responsive to a selected one of said first plurality of basic pulse signals to produce one of said first plurality of control pulse signals having a pattern identical to the pattern of said selected one of said first plurality of basic pulse signals, and logic means for the logical combination of another selected one of said first plurality of basic pulse signals having its transitions timed by clock pulses of said second train of clock pulses with selected ones of said first plurality of basic pulse signals having their transitions timed by clock pulses of said first train of clock pulses, to produce the others of said first plurality of control pulse signals.

3. A system according to claim 2, wherein said selected one of said first plurality of basic pulse signals is included in each logical combination to produce said others of said first plurality of control pulse signals.

4. A system according to claim 1, wherein said first means includes, means to select clock pulses of predetermined orders out of said first and second trains of clock pulses, and means responsive to said clock pulses of predetermined orders, to produce said first plurality of basic pulse signals.

5. A system according to claim 4, wherein said means to select clock pulses of predetermined orders are controlled by selected ones of said first plurality of basic pulse signals.

6. A system according to claim 1, wherein said control pulse signals have their length stabilized by said first means responding to a selected one of said first and second pulse trains to time the transitions of said first plurality of basic pulse signals and by said second means responding to the transitions of said first plurality of said basic pulse signals.

7. A system according to claim 1, wherein said first means includes a first plurality of divider means to produce said first plurality of basic pulse signals, each of said first plurality of divider means having a pair of inputs, one of said first divider means having one input of said pair of inputs connected to said first input of said first means and the other input of said pair of inputs connected to said second input of said first means, another of said first divider means having one input of said pair of inputs connected to said first input of said first means, first logic circuit means having its output connected to the other input of said pair of inputs of said another of said first divider means and its inputs respectively coupled to said second input of said first means, to the output of said another of said first divider means and to the output of selected ones of said first plurality of divider means, the remainder of said first divider means each having the other input of said pair of inputs coupled to said second input of said first means, and second logic circuit means for each of said remainder of said first divider means, each of said second logic circuit means having its output connected to one input of said pair of inputs of said remainder of said first divider means and its inputs coupled to said first input of said first means and the output of selected ones of said first plurality of divider means.

8. A system according to claim 7, wherein each of said divider means includes first and second gated input storage elements; said one input of said pair of inputs of each of said divider means is coupled to said first storage elements; said other input of said pair of inputs of each of said divider means is coupled to said second storage elements; said one of said divider means and said remainder of said divider means produce certain ones of said first plurality of basic pulse signals at the output of said first storage elements; and said another of said divider means produces another of said first plurality of basic pulse signals at the output of said second storage element.

9. A system according to claim 1, further including second switching means to control the generation of a second time division multiplex signal; and second timing means coupled to said second switching means to time the operation thereof by a second plurality of control pulse signals including third means identical to said first means having a first input coupled to said other of said two outputs of said clock pulse source and a second input coupled to said one of said two outputs of said clock pulse source to produce a second plurality of basic pulse signals having predetermined patterns whose transitions are timed by clock pulses of said source, and fourth means identical to said second means coupled to said third means responsive to predetermined ones of said second plurality of basic pulse signals to produce said second plurality of control pulse signals each having a predetermined pattern whose transitions are timed by transitions of a basic pulse signal of said second plurality of said basic pulse signals, the predetermined patterns of said first and second plurality of basic pulse signals are identical in shape but time displaced relative to each other by a given interval equal to the interval between a clock pulse of said first pulse train and the next succeeding clock pulse of said second train, and the predetermined patterns of said first and second plurality of control pulse signals are identical in shape but time displaced relative to each other by said given interval.

10. A system according to claim 9, further including a first plurality of information channel means coupled to be controlled by said first switching means to cooperate in the generation of said first multiplex signal, a second plurality of information channel means coupled to be controlled by said second switching means to cooperate in the generation of said second multiplex signal; and fifth means coupled to said first channel means and said second channel means to combine said first and second multiplex signals so that the transitions of said second multiplex signal occur between the transitions of said first multiplex signal.

11. A system according to claim 10, wherein the information of said first and second multiplex signals is binary in form, and said fifth means adds the amplitude of the information of said second multiplex signal to the amplitude of the information of said first multiplex signal providing a combined time division multiplex output signal therefrom having effectively three amplitude conditions.

12. A system according to claim 9, wherein said first means includes a first plurality of divider means to produce said first plurality of basic pulse signals, each of said first plurality of divider means having a pair of inputs, one of said first divider means having one input of said pair of inputs connected to said first input of said first means and the other of said pair of inputs connected to said second input of said first means, another of said first divider means having one input of said pair of inputs connected to said first input of said first means, first logic circuit means having its output connected to the other of said pair of inputs of said another of said first divider means and its inputs respectively coupled to said second input of said first means, to the output of said another of said first divider means, and to the output of selected ones of said first plurality of divider means, the remainder of said first divider means each having the other input of said pair of inputs connected to said second input of said first means, and second logic circuit means for each of said remainder of said first divider means, each of said second logic circuit means having its output connected to one of said pair of inputs of said remainder of said first divider means and its inputs respectively coupled to said first input of said first means and the output of selected ones of said first plurality of divider means, and said third means includes a second plurality of divider means to produce said second plurality of basic pulse signals, each of said second divider means having a pair of inputs, one of said second divider means having one input of said pair of inputs connected to said first input of said third means and the other of said pair of inputs connected to said second input of said third means, another of said second divider means having one input of said pair of inputs connected to said first input of said third means, third logic circuit means having its output connected to the other of said pair of inputs of said another of said second divider means and its inputs respectively coupled to said second input of said third means the output of said another of said second divider means and the output of selected ones of said second plurality of divider means, the remainder of said second divider means each having the other input of said pair of inputs connected to said second input of said first means, and fourth logic circuit means for each for said remainder of said second divider means, each of said fourth logic circuit means having its output connected to one of said pair of inputs of said remainder of said second dividing means and its inputs respectively coupled to said first input of said third means and the output of selected ones of said second plurality of divider means.

13. A system according to claim 12, wherein each of said first and second divider means includes first and second gated input storage elements;

said one input of said pair of inputs of each of said first and second divider means is coupled to said first storage elements;

said other input of said pair of inputs of each of said first and second divider means is coupled to said second storage elements;

said one of said first and second divider means and said remainder of said first and second divider means produce certain ones of said first and second plurality of basic pulse signals at the output of said first storage elements; and said another of said first and second divider means produce others of said first and second plurality of basic pulse signals at the output of said second storage elements.

References Cited

UNITED STATES PATENTS

| | | | |
|---|---|---|---|
| 2,840,306 | 6/1958 | Steele | 179—15 |
| 2,912,684 | 11/1959 | Steele | 178—67 |
| 3,089,921 | 5/1963 | Hines | 179—15 |
| 3,139,615 | 6/1964 | Aaron | 325—38 |
| 3,194,889 | 7/1965 | McAdams | 179—15 |
| 3,311,706 | 3/1967 | Brightman et al. | 179—15 |
| 3,404,237 | 10/1968 | Bartlett | 179—15 |
| 3,414,889 | 12/1968 | Higgins et al. | 179—15 |

FOREIGN PATENTS 913,981 12/1962 Great Britain.

OTHER REFERENCES

E. E. Marquardt, "High Speed Cycling Device," IBM Technical Disclosure Bulletin, vol. 1, No. 6, April 1959, p. 37.

KATHLEEN H. CLAFFY, Primary Examiner

A. B. KIMBALL, Jr., Assistant Examiner

U.S. Cl. X.R.

325—38